United States Patent [19]
Ehler et al.

[11] Patent Number: 5,721,753
[45] Date of Patent: Feb. 24, 1998

[54] RECORDING VERIFICATION SYSTEM

[75] Inventors: Guy W. Ehler, Easton, Pa.; Martin P. McEnroe, Jackson, N.J.; Andrew Schnable, Naperville, Ill.; Quyen Tran, Marlboro, N.J.

[73] Assignee: Lucent Technologies Inc., Murray Hill, N.J.

[21] Appl. No.: 365,268

[22] Filed: Dec. 28, 1994

[51] Int. Cl.⁶ ............................ H04M 1/24; H04M 15/00
[52] U.S. Cl. .......................... 379/14; 379/13; 379/112; 379/121
[58] Field of Search .................... 375/1, 9–18, 34, 375/201, 114, 112, 115, 121; 370/241, 292, 244, 250

[56] References Cited

U.S. PATENT DOCUMENTS

| | | |
|---|---|---|
| 4,351,984 | 9/1982 | Young et al. . |
| 4,455,453 | 6/1984 | Parasekvakos et al. . |
| 4,511,963 | 4/1985 | Kantner . |
| 4,751,728 | 6/1988 | Treat . |
| 4,776,004 | 10/1988 | Bauer et al. . |
| 4,839,916 | 6/1989 | Fields et al. . |
| 4,870,679 | 9/1989 | Hanna et al. . |
| 4,910,760 | 3/1990 | Reformato ............................ 379/13 |
| 5,003,584 | 3/1991 | Benyacar et al. . |
| 5,218,632 | 6/1993 | Cool . |
| 5,241,580 | 8/1993 | Babson, III ........................... 379/15 |
| 5,369,680 | 11/1994 | Borbas et al. ........................ 379/13 |

FOREIGN PATENT DOCUMENTS

| | | | |
|---|---|---|---|
| 3215651 | 4/1982 | Germany . | |
| 2-295582 | 6/1992 | Japan ................................... 379/13 |
| 4-223706 | 11/1994 | Japan ................................... 379/13 |

*Primary Examiner*—Curtis Kuntz
*Assistant Examiner*—Paul Loomis

[57] ABSTRACT

The integrity of AMA records generated by a switch in the telephone network is achieved by generating test calls and then monitoring and then processing the AMA records generated by those switches in the network which handled the test call. Such monitoring includes tracking for the AMA records that have been generated for the test calls and then processing those records such that the contents of the fields forming the records are analyzed to determine that the data contained therein is correct.

20 Claims, 5 Drawing Sheets

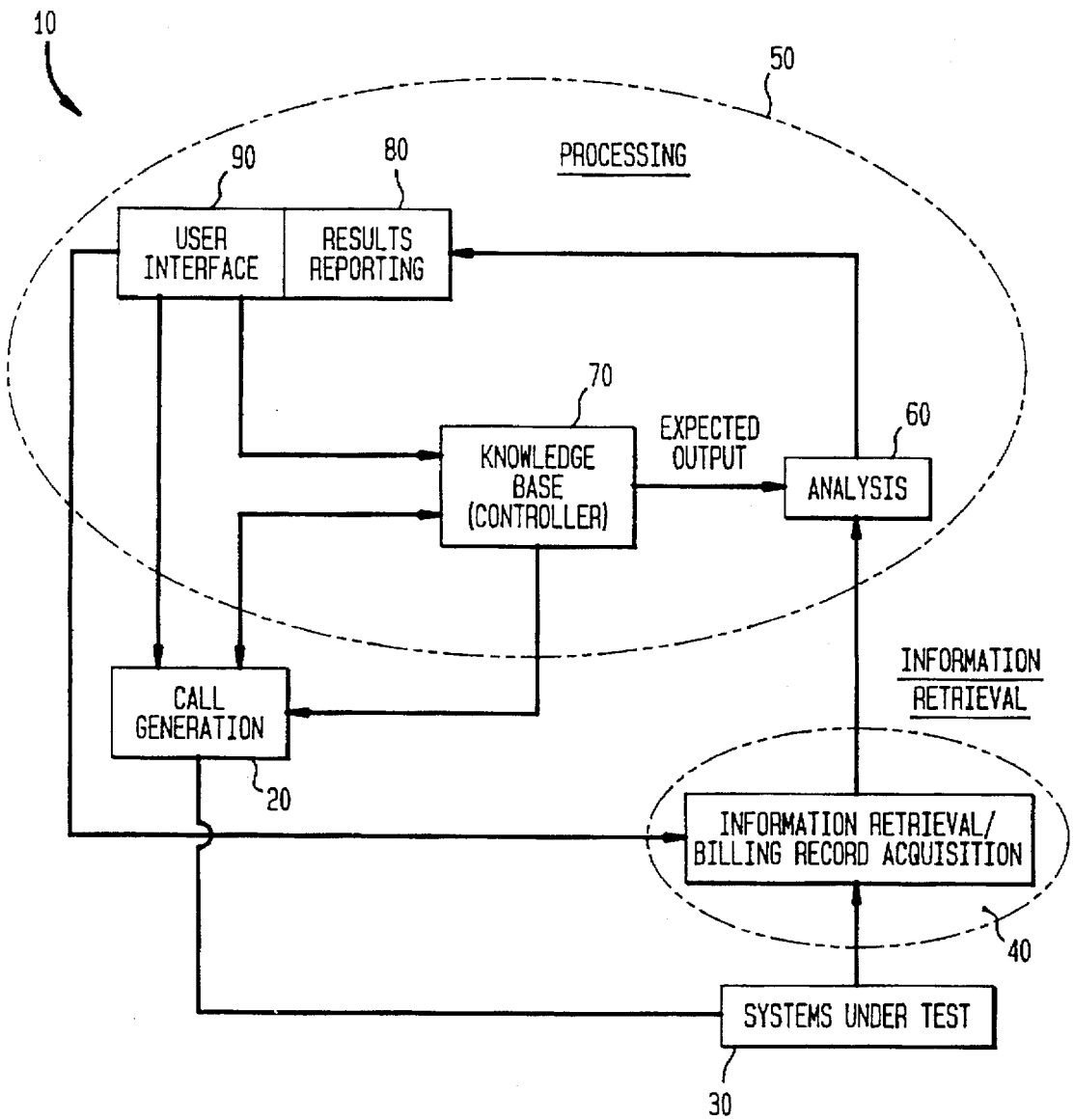

FIG. 2A

UNPACKED DATA

```
aa          00360000    060C        01600C      20622C
00001C      0310000C    1C          0C          1C          001C
00702C      4721201C    1621493C    000000102C
ffef        00831C      0C          0C          0C
09993974621C
```

FIG. 2B

UNPACKED DATA

```
                    FORMATTED DATA

HEXADECIMAL IDENTIFIER                    aa
RECORD DESCRIPTOR WORD                    0036000
STRUCTURE CODE                            01500C
CONNECT DATE                              20622C
TIMING INDICATORS                         00001C
STUDY INDICATOR                           0310000C
ANSWER INDICATOR                          1C
SERVICE OBSERVED INDICATOR                0C
OPERATOR ACTION INDICATOR                 1C
SERVICE FEATURE INDICATOR                 001C
TERMINATING NPA                           00702C
TERMINATING NUMBER                        4721201C
CONNECT TIME                              1621493C
ELAPSED TIME                              000000102C
TRUNK GROUP NUMBER                        00831C
BILL TO INDICATOR                         0C
OPERATOR CHARGE INDICATOR                 0C
CALL PROGRESS STOPPED INDICATOR           0C
ALTERNATE BILLING NUMBER INDICATOR        09993974621C
```

```
                    FORMATTED DATA

MODULE CODE                         908C
    DIRECTION INDICATOR                 103C
    ACCESS INDICATOR                    020C
    NUMBER DIALED                       09991234567C
    ALTERNATE NUMBER DIALED             000000000C
```

RECORDING VERIFICATION SYSTEM

BACKGROUND OF THE INVENTION

1. Field of the Invention

The present invention is directed generally to a recording verification architecture and, more specifically, to the detection of errors resulting from telephone network software implementation requirements and/or defects.

2. Description of the Related Art

In the past, there have been various attempts made to check the accuracy of various recording structures associated with a telephone system network. For example, in U.S. Pat. No. 4,839,916, a system for checking the integrity of a telephone system is disclosed. In that system, the presence of detectable information available to a consumer is automatically compared by a central computer with billing information collected by the billing computer to ascertain operational accuracy of the billing computer. However, such systems have only focused on information available to a consumer.

Moreover, prior attempts have only focused on the accuracy of new features of telephone systems as the new features are implemented. For example, in telephone systems, various records which describe various details pertaining to a telephone call are often represented using formats such as the Automated Message Accounting (AMA) format. When a new feature is added to a telephone network, a new or slightly different AMA record is created having information, so-called "modules", directed to (1) the new feature or (2) changes to fields in the record. Accordingly, when the new feature is implemented on the system, a quick spot-check is often performed on the AMA record to determine whether the record reflects some accurate details regarding the new feature. However, these prior attempts have failed to address the overall impact of the new features, and the associated new modules appended to the new AMA record directed to the telephone call including the new feature. Accordingly, the addition of new features often disrupts accurate recording, and therefore accurate billing, of telephone calls.

Interestingly, the specifications pertaining to AMA criteria exhibit a clear lack of focus on the need for test calls and validation tests. In particular, it has been widely believed that AMA data for test calls are not normally required or would be difficult to implement because of the complexity of the data created. Moreover, if AMA data was generated for a test call, a test call indicator was included in a particular AMA field to assist the system in discarding this AMA data, rather than utilize the data. Even if this data is used, the use of such test call indicators often leads to a failure to exercise the correct logic paths of a system under test related to the implementation of real telephone calls.

In particular, although there are numerous patents and references directed to the testing of a system's ability to deliver service (i.e., by monitoring noise levels and post-dial delay for example), such testing has failed to address a service system's ability to generate information that billing systems require to create accurate invoices. Moreover, other patents, such as U.S. Pat. No. 4,351,984, focus only on methods to bill service delivery, and have therefore also failed to address concerns associated with accurate billing information recording.

In addition, one obstacle to accurate and efficient testing of AMA billing records can be seen in the need to maintain and update testing tools to keep up with changes in the AMA format. In particular, when a switch changes, the AMA format or content will also necessarily change thereby requiring a change in the testing tool. Accordingly, such an obstacle has presented a significant deterrent to accurate and effective testing of AMA billing records.

Accordingly, in view of the fact that prior systems were not properly configured to adequately detect and monitor errors in recording which arise from software defects, there exists a clear need to proactively prevent revenue loss, and other efficiency losses, due to such recording problems. Moreover, in the past when a new format of a AMA record was introduced, existing computer software which analyzed AMA data needed to be reconfigured so as to properly yield consistent output. Such reconfiguration often leads to a time-consuming dual development process. Accordingly, there is a clear need to configure the computer system so that it is driven in a manner to alleviate the need to reconfigure test computer software upon the introduction of new variations in AMA format, thereby eliminating any unnecessary dual development.

SUMMARY OF THE INVENTION

The present invention achieved many advantages and contains features for providing a recording verification architecture to test a service delivery system from call generation to record formation. Features of the present invention include coupling call generation, and AMA record retrieval, and analysis in one system, specification driven analyses of information, comparison of retrieved records with template records, among others.

In accordance with these features and advantages, the present system provides a method of performing recording verification, including the steps of: generating a plurality of test calls, generating records of said test calls by at least one switch in the network, and performing a regression analysis of the records to determine if data contained within the records is correct. The regression analysis of the present invention may include both template checking and specification checking. The present invention may also include a recording verification architecture, including a call generator, a record retriever, and a record analyzer adapted to perform a regression analysis on calls generated by said call generator and records retrieved from said record analyzer to determine if data contained within said records is correct.

These, together with other features and advantages which will be subsequently apparent, reside in the details of construction and operation and is more fully hereinafter described in the claims, with reference being had to the accompanying drawings forming a part hereof, wherein like numerals refer to like elements throughout.

BRIEF DESCRIPTION OF THE DRAWINGS

FIG. 1 is a flow chart depicting the overall structure of a preferred embodiment of the instant invention.

FIG. 2a is a depiction of raw unpacked AMA structure data as it might appear for analysis by the preferred embodiment of the instant invention.

FIG. 2b is a depiction of a raw unpacked AMA module as it might appear for analysis by the preferred embodiment of the instant invention.

FIG. 3a is an exemplary depiction of how the raw unpacked AMA data of FIG. 2a might be formatted.

DETAILED DESCRIPTION OF A PREFERRED EMBODIMENT OF THE INSTANT INVENTION

Figures 3B, 4:
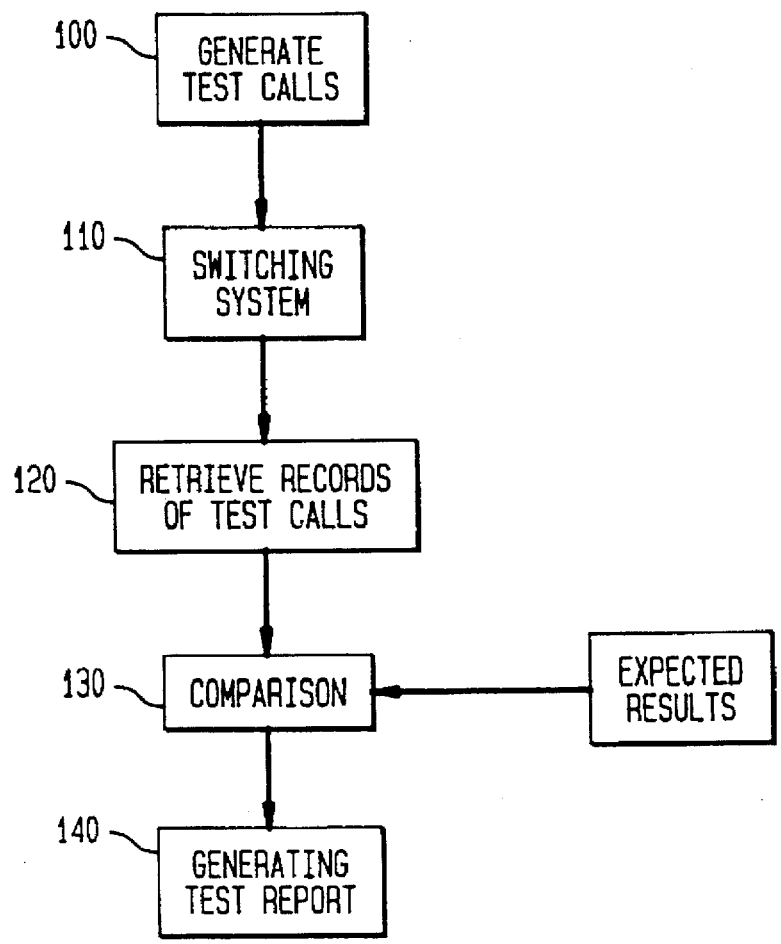
FIG. 3b is an exemplary depiction of how the raw unpacked AMA data of FIG. 2b might be formatted.
FIG. 4 is a flow chart depicting the methodology utilized by the preferred embodiment of the instant invention.

In general, the present invention is directed to a system and method for verifying recording architecture. The integrity of AMA records generated by a switch in the telephone network is enhanced by generating test calls and then monitoring and processing the AMA records generated by those switches in the network which handled the test call. Such monitoring includes tracking for the AMA records which have been generated for the test calls and then processing those records such that the contents of the fields forming the records are analyzed to determine if data contained therein is correct.

The system performs, generally, three integrated functions, as depicted in FIG. 1. The overall system 10 includes a call generation element 20, an information retrieval element 40, and a processing element 50, each of which will be described in greater detail below.

Overall, the system 10 performs the function of tracking records generated for telephone calls and processing the records such that fields forming the records are analyzed to determine if data contained therein is correct.

In step 20, a test telephone call is generated for analysis by the system. In the preferred embodiments, the call is generated by a SAGE box or an Ameritech box, although it is to be understood that other call generating architecture, including AT&T specific architecture, may also be utilized. The generation of calls will create billing records at step 20 and ultimately yields expected data (which usually is generated upon the completion of a call) regarding the specific details of the telephone call in question.

From the generated call at step 20, a signal is passed through the switching system, or switch, of the systems under test at step 30. Such systems under test may include, among others, switching systems such as the AT&T 4ESS™ and AT&T 5ESS™. The electronic switching system of the 4ESS™ design is described in greater detail in a series of articles published in the Bell System Technical Journal (BSTJ), Sept. 1977, Vol. 56, No. 7 at pages 1017 et seq., herein incorporated by reference. The electronic switching system of the 5ESS™ design is extensively described in a series of articles in the AT&T Technical Journal, Vol. 64, No. 6, part 2, July/August 1985, at pages 1305–1564, herein incorporated by reference.

From the switch, or plurality of switches, of the systems under test at step 30, information regarding the telephone call in question is generated at step 30 and retrieved at step 40. Such information is retrieved by redirecting records from a billing system to a structure for performing analysis at 60. This is often referred to as "collector emulation" because the normal downstream billing system is replaced with some structure to perform an analysis at step 60.

Generally, the information retrieved from a call in question includes information regarding the automated message accounting (AMA) features. An example of what raw AMA data might look like is shown in FIG. 2a. An example of how a raw AMA module might look is shown in FIG. 2b.

With continuing reference to FIGS. 2a and 2b, it can be seen that a telephone call generates a significant amount of numerical data for analysis. When a new feature is added to a telephone system, AMA data will include additional numerical information directed to that new feature. Because the code used in switching systems to generate AMA record of usage has grown extraordinarily complex, the addition of new fields (new data) which relate to new features on the telephone network (i.e. three-way calling, call waiting, etc.) may generate errors on the existing AMA fields, modules and code. Accordingly, a test sweep including a full regression analysis is performed to ascertain the effect of the new features/new fields on existing AMA data. Some of the errors which occurred prior to the instant invention were that the addition of new features disrupted existing recording architecture such that calls which were not supposed to have the new fields, in fact, had them. When a recording or billing system fails to understand a particular AMA data sequence, it likely simply removes that AMA data sequence as being erroneous, and therefore fails to properly bill for that particular telephone call.

Each of the numerical digits of the unpacked AMA data of FIGS. 2a and 2b correspond to some information regarding the circumstances surrounding a telephone call. For example, FIGS. 3a and 3b depict a formatted AMA data profile which provides a certain degree of description of the meaning of the numerical information of the unpacked AMA data of FIG. 2a and 2b, respectively. The formatted AMA data is dependent on when, where, and how various calls are made.

Accordingly, the information retrieval portion 40 of system 10 retrieves AMA data from the systems under test 30 for processing and analysis.

In sum, therefore, a user interface at 90 stimulates the call generator at 20 to make calls and, in response to these calls, billing data (AMA data) is delivered to an information retriever/billing record acquirer at step 40 over billing links. Billing records are output asynchronously to the call being made.

The processing step 50 of system 10 includes a series of subparts including analysis at step 60, maintaining a knowledge base at step 70, reporting results at step 80, and the interface of a user at step 90. Each of these steps interrelates with various other portions of system 10 as shown in FIG. 1. Analysis of the retrieved information at step 60 takes place at various levels. In particular, analysis may include two types of checks performed on the AMA data itself: specification testing and template checking.

Among the various levels of analysis are the following: fixed, variable, and provisioned. The fixed portion of the analysis may include two subparts including the basic format of the data and particular features of the call. The basic format of the data includes information such as the call code, structure code, modules, etc. The particular features of the call include the possibility that the call was routed through a specific location (i.e. rerouting of telephone calls during a natural disaster). The provisioned portion of the analysis includes information regarding what party is calling what other party. The variable portion of the analysis includes information relative to a specific instance of the call (such as the length of time, etc.).

At step 70, the expected output of the knowledge base, which is a function of the actual call generated at step 20, is forwarded by a controller at 70 to the analysis portion at step 60 for comparison. The results of this comparison are forwarded to step 80 which interacts with the user interface at step 90. The knowledge base/controller at step 70, which interacts with the user interface at 90, both drives the call generator at step 20 so as to direct the call generator to place various calls at step 20, and also forwarding information regarding expected output for use during the analysis step at step 60.

Accordingly, there are multiple components of the function of system 10, which include session control through a user interface, a knowledge base of calls to place, records to expect, call generation, formatted record retrieval, analysis and comparison of actual records with expected records, and the reporting of analysis results.

In the present invention, records generated by a switch are redirected from a billing system to a structure for performing analysis.

Various architectures may be used to implement the present invention. Among these architectures are the following: segregated, integrated, and centralized. In a segregated architecture, many discrete components are used to accomplish the necessary functions. For example, several types of call generation could each reside on a physically distinct and diverse platform. Information would be retrieved on a second set of platforms and analysis would be carried out on the third set. Moreover, each set could be a combination of machines running DOS, Windows, and/or UNIX. Since the machines are not networked, all data would in such a system have to be transmitted via floppy disc.

In an integrated system, the user interface for all tasks is brought together on one machine. A user could schedule a session from the calling profiles available, interact with all sets of call generation equipment, retrieve information, and execute analysis. However, each platform would be standalone. Resource contention between users would not be solved. Users would still consciously choose to share data by E-Mail. Moreover, the choice for an operating system would be made by a chosen developer.

In a centralized choice, a central server serves as an interface between all users and any piece of call generation, system under test, or analysis tool. All information is available in such a system at a single point of user interface. Information about each test run would be available to all authorized users.

In accordance with the present invention, the flow chart of FIG. 4 depicts the analysis of a preferred embodiment of the present invention. First, test calls are generated at step 100, and passed through a switching system 110. A set of second records of the test calls which correspond to observed output are retrieved at step 120, and then analyzed and compared to a set of first records which correspond to expected output at step 130. A report is then generated at step 140.

Accordingly, this testing structure, from call generation through record retrieval, insures that the recording process meets all functional requirements. The test methodology consists of generating all possible call types using all incoming signalling supported by the particular switch, such as the 4ESS™ or 5ESS™, among others, in such a manner that all possible recording formats are generated. Testing must ascertain that the appropriate AMA fields and records generated are populated with predetermined values. The resulting AMA data sets are written to tape by a call detail recording platform within the systems under test at step 30. These data sets can be stored in a file on a standalone computer system, such as a UNIX or DOS based system, and compared to another file containing the expected results at step 60. The output of the comparison indicates differences between the expected output and the observed output.

Accordingly, the present invention includes the coupling of call generation, AMA record retrieval and analysis in one system. Preferably, the present invention utilizes preprogrammed call scenarios and is implemented on a telephone network such that information from the systems under test may be simply tapped into or redirected into the recording verification system.

In the present invention, every retrieved record is compared against formats in the call detail records data base. Moreover, the retrieved records may be matched against "Golden" template records by generating call information and saving the resulting record. The Golden template records include information regarding the actual characteristics of a call. Such template records are particularly useful when the expected results from a call generator are somehow inaccurate in view of some error within the call generator.

The present invention also includes the ability to use specification information to instruct the recording verification system and software on proper functioning. Data retrieved from the AMA data base is used to build objects from the data base so as to run the software with formatted data. Objects for the database include information such as field name and the number of characters associated with that field. The field name and number of characters is information which is available from BellCore documentation as well as specific AMA documentation used by various telephone services and corporations, such as AT&T provided AMA formats. Accordingly, the use of this part of the recording verification system obviates the need to change the software code for the test tools every time the AMA formats are somehow updated or the switch is changed. Accordingly, while the AMA format may change, the code analyzer uses the format of the AMA to handle retrieved records or extract some information from the records, thereby obviating the need for updates to the software upon an update in AMA format.

Accordingly, the recording verification architecture and method of the present invention involve two levels of testing/checking: template checking and specification checking. Accordingly, the two stages of analysis can be separated into (1) determining whether the data is erroneous per se, and (2) comparing expected data to actual retrieved data. Template checking, a type of checking which is performed upon request by a user, helps assure that test calls are repeatable and that consistent information is recorded on repeated test runs. In this regard, the present invention utilizes flexible templates which are based on regular expressions. Normally, when the test call is made and the record is captured, a template is created which can be used for comparison with repeated calls as an indicator of the expected type of record. However, when comparing fields of templates made with repeated calling, some fields are different in view of variations in the call, such as different time of day, etc., although some fields remain the same. Template checking, accordingly, focuses on those fields which should remain the same from call to call.

With regard to template checking, the present invention utilizes a technique called wildcarding in which a user may describe a pattern to detect proper matching of values. In other words, wildcarding allows the user to describe what value is sufficiently close to yield the determination that a proper match has been established, and that no error exists. This is often referred to as "regular expression match". With regard to the regular expression match, a pattern is used which would detect proper matching of values. Another type of check which is performed is referred to as an "enumeration check". In such a check, a list of values which are acceptable (i.e. 1,3,10) are established. Should a value be detected other than this acceptable list of values, an error is detected. A third type of check which is performed is referred to often as a range check, in which a range is established to detect correct and/or incorrect values. A fourth type of check which is referred to as an "exact checker" may also be utilized when an exact value or form is expected from a subfield.

With regard to specification checking, a form of testing which is performed during all tests of the present invention, the fields of the record are tested to assure compliance to the specification. For example, if the type of call now made is known, it is known that the originating phone number must contain a certain value. If the type of phone call made is not known, it is at least known, for example, that the area code does not start with a zero. Accordingly, there are tests which can be performed by simply looking at the specification. Accordingly, the system of the present invention reviews every record to determine conformance with the specification.

The specification checking of the present invention may be divided into various subparts: whether the records are the right size, whether the fields are properly padded, whether the call code and structure code are compatible, and whether the fields contain invalid data (i.e. the area code cannot begin with a zero). With regard to the proper padding of fields, for example, if the specification requires a field of "fffff" but the retrieved field is "fffdf", an error is detected.

In the present invention, the information of the specification is translated into one of the aforementioned four tests (regular expression, enumeration, exact or range) and then each subfield of the record is checked.

Figure 5:
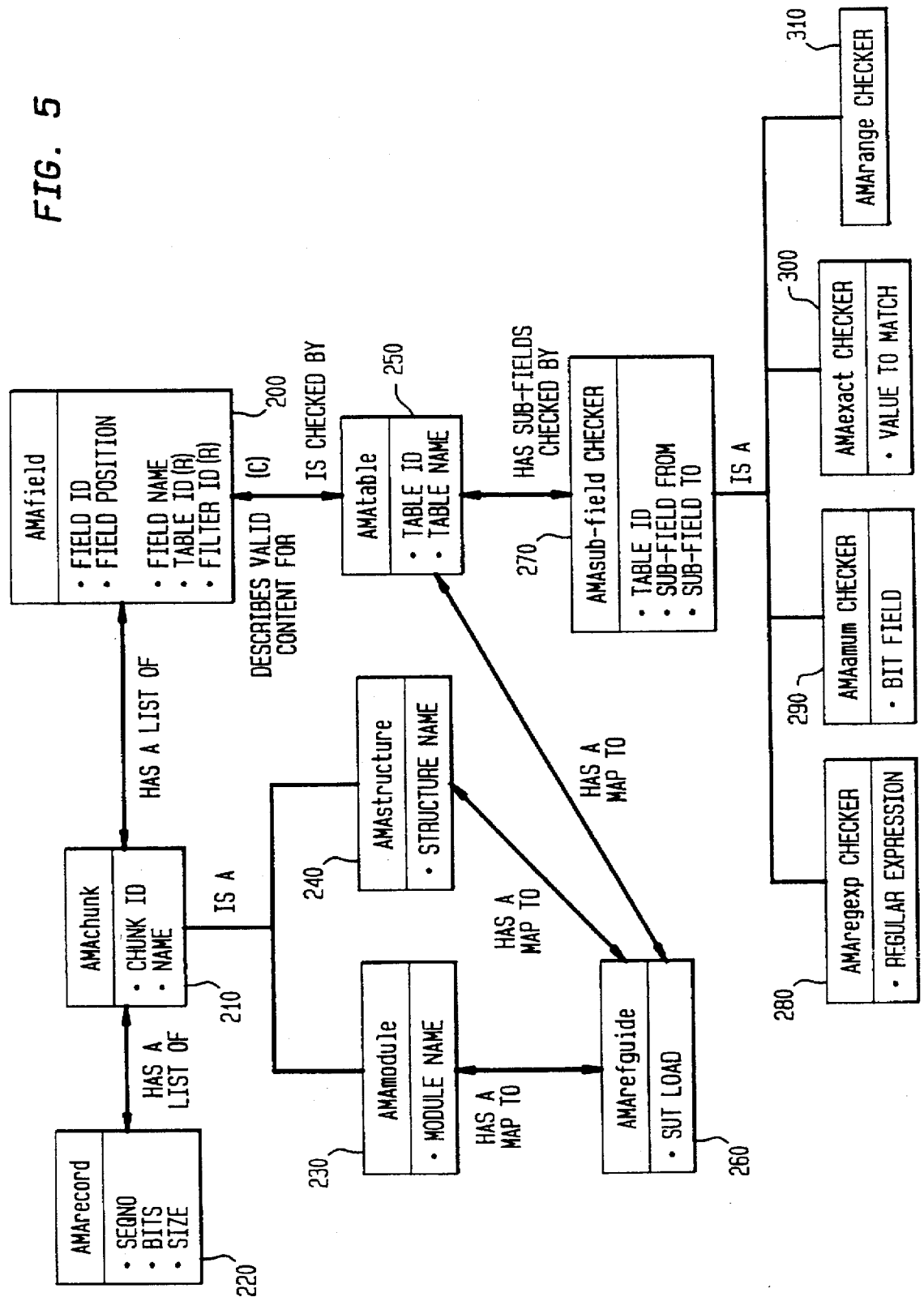
FIG. 5 is a block diagram depicting the methodology of the specification-driven testing of the present invention.

With reference to FIG. 5, an entity relationship diagram depicting the data design of the specification-driven testing of the present invention is shown. With continuing reference to FIG. 5, each of the numbered blocks 200–310 represents an object in the system of the present invention. The object-oriented system of the present invention is utilized to create each of these objects. In general, these objects are created by inputting and following the guidelines provided by the specification. AMA records from block 220 have lists of AMA chunks, which in turn, have lists of AMA fields. The specification is utilized to determine whether a "chunk" at block 210 is a module from block 230 or a structure from block 240. Each field at AMA field block 200 is checked by a table from AMA table block 250. A table is created by reading the specification and is comprised of descriptions of fragments of a record. Each table, therefore, has sub-fields which are checked by a AMA sub-field checker at block 220. The AMA sub-field checker utilizes one of a series of checking analyses 280, 290, 300, 310 to perform its function.

When the specification is read, the network of objects shown in FIG. 5 is created. By referring to the specification through the system, certain information is known, such as the types of tables, sub-field checkers, AMA fields, how the fields are ordered for all modules and structures in the system, etc. Accordingly, the AMA reference guide serves as a "table of contents" or an index. Because the AMA module block 230, the AMA structure block 240 and the AMA table block 250 each have a map to the AMA reference guide at block 260, this object-oriented system, although computer-implemented, models what an individual would normally manually perform without a computer.

In sum, therefore, when the system of the present invention is started, the system reads the specification, and dynamically creates all of the objects depicted in FIG. 5 and all of the relationships between objects, and fills-in all indexes, lists, etc. for use as an electronic reference guide.

Once the reference guide is loaded and the system of the present invention is running, records are acquired through a record stream from a switch under test. The record is populated with the next valid record or bits in the input stream. Then, the reference guide is used to analyze the record-field by field, sub-field by sub-field. In particular, the AMA field block 200, and the known information coded therein, and from information regarding use of the AMA modules and structures from AMA chunk block 210 is used to determine which table to utilize at AMA table block 250. With reference to AMA field block 200, each field include a field ID, a field position, a field name, a table ID (a link to the field object), and a filter ID (a link to the filter object). The table ID and table name determined at AMA table block 250 is used to check the sub-field at AMA sub-field checker block 270. With reference to AMA sub-field checker block 270, the sub-field may be broken down such that from a specific point in the sub-field ("sub-field from") to another specific point in the sub-field ("sub-field to"), a particular checker from blocks 280–310 may be utilized, while other specific portions of the sub-field may be checked by another checker 280–310 (regexp checker, enum checker, etc.). Should the accuracy of information not be confirmed by the sub-field checker 270, an error message is then generated.

The present invention may also be designed to allow testing of various switches. With reference to AMA reference guide block 260 of FIG. 5, if multiple switches having multiple loads or formats (SUT load or "systems under test" load), and used multiple reference guides may be needed (one per load). Accordingly, the SUT load may be used as an identifier to determine which reference guide (of several guides) to use.

Accordingly, the present invention involves a tool which reads in the structure definitions, module definitions, and table definitions of the AMA reference guide so as to turn it into a database to become an input source to look at each record. In other words, the present invention distills the AMA reference guide text document to become an input source so as to allow the tool to always learn from the specification as the specification is changing, due to enhancements in the specification, or changes in the switch. This is in stark contrast to the previous way of providing a virtual snapshot of the specification into the testing tool, thereby necessitating a manual refurbishing of the testing tool upon any change in the specification due a change in the AMA reference guide or the switch in question. Accordingly, the testing tools of the present invention are maintained regardless of any changes in the switch and/or structure codes. Accordingly, the testing tools are tied into system engineer's database, thereby eliminating any doubt as to whether the testing tool is updated.

The specification-driven aspects of the present invention are driven using class libraries or object-oriented code from the database of AMA formats and allowable values. The use of object-oriented codes is known from texts such as "OBJECT-ORIENTED SYSTEMS ANALYSIS Modeling the World in Data" by Sally Shlaer and Stephen Mellor, Prentice Hall, 1988. In the preferred embodiment of the present invention, C++ was used to develop class libraries for use in the specification driven analysis of the present invention.

It is to be understood that accurate recording of various features may be verified through the use of the recording verification architecture of the present invention. In particular, recording of call interaction which involves the use of tones entered from a touch tone phone in response to a voice menu may be verified through the use of the present invention. Moreover, voice input in response to a voice menu may also be verified through the use of the present invention.

The many features and advantages of the invention are apparent from the detailed description, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for verifying proper recording of information in a telephone network, comprising:

initiating a feature on said telephone network;

generating a plurality of test telephone calls, at least one of said telephone calls comprising said feature;

maintaining a set of first records of said test telephone calls, each of said first records comprising a plurality of fields at least one of said fields corresponding to said feature, each of said first records corresponding to one of said test telephone calls;

transmitting said test telephone calls through at least one switch;

recording a set of second records of said test telephone calls having passed through said at least one switch, each of said second records comprising a plurality of fields, at least one of said fields corresponding to said feature, each of said second records corresponding to one of said test telephone calls; and comparing the fields of said first records corresponding to each of said test telephone calls with the fields of said second records corresponding to said telephone calls to determine accuracy of said second records.

2. The method of claim 1 wherein said comparing step comprises the step of determining any effects of said feature on the set of second records.

3. The method of claim 1 wherein said first records and said second records comprise automated message accounting records.

4. The method of claim 1 further comprising:

performing a regression analysis on said telephone network to determine any effects of said feature on the set of second records.

5. The method of claim 4 wherein said regression analysis comprises comparing a record of a first test telephone call which does not implement said feature with a record of a second test telephone call which implements said feature to determine the effect of said feature on said telephone network.

6. The method of claim 1 wherein said comparing comprises both template checking and specification checking.

7. The method of claim 6 wherein said comparing involves the use of testing tools which are automatically updated upon changes to specifications of said records or changes in said at least one switch.

8. The method of claim 4 wherein said comparing step is implemented between said first and second test telephone calls having similar fixed, provisioned and variable information, other than information pertaining to said implementation of said new feature.

9. The method of claim 1 wherein said feature is directed to call interaction information.

10. A recording verification method, comprising:

generating a plurality of test calls, including at least one new feature in at least one test call;

generating records of said test calls through at least one switch in a network; and performing a regression analysis of said copies of said records by comparing recorded and expected information at multiple levels to determine if data contained within said records is correct.

11. The method of claim 10 wherein said regression analysis comprises:

monitoring said records generated by said at least one switch on said network; and processing said records to determine if data contained therein is correct.

12. The method of claim 11 wherein said monitoring step comprises tracking records generated for said test calls.

13. The method of claim 12 wherein said processing includes analyzing all fields forming said records through regular expression checking, enumeration checking or range checking.

14. The method of claim 10 further comprising redirecting records generated by said at least one switch from a billing system to a structure for performing said regression analysis.

15. The method of claim 10 wherein said generating is performed on a live telephone network.

16. The method of claim 10 wherein said levels include variable, provisioned and fixed levels.

17. A recording verification architecture, comprising:

a call generator;

a record retriever in communication with said call generator, wherein a retrieved record corresponds to a generated call;

a record analyzer in communication with said call generator and said record retriever, said record analyzer adapted to perform a regression analysis on calls generated by said call generator and records retrieved from said record analyzer by comparing recorded and expected information at multiple levels to determine if data contained within said records are correct.

18. The recording verification architecture of claim 17 wherein said record retriever is adapted to redirect calls from a telephone switching system to said record analyzer.

19. The recording verification architecture of claim 18 wherein said record analyzer is adapted to compare recorded and expected information regarding a series of generated calls representing a variety of different calls.

20. The recording verification architecture of claim 19 wherein said multiple levels include variable, provisioned and fixed levels.

* * * * *